(12) United States Patent
Vasseur et al.

(10) Patent No.: US 9,385,933 B2
(45) Date of Patent: Jul. 5, 2016

(54) REMOTE PROBING FOR REMOTE QUALITY OF SERVICE MONITORING

(71) Applicant: Cisco Technology, Inc., San Jose (CA)

(72) Inventors: Jean-Philippe Vasseur, Saint Martin d'Uriage (FR); Sukrit Dasgupta, Norwood, MA (US); Jonathan W. Hui, Belmont, CA (US); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 199 days.

(21) Appl. No.: 13/926,672

(22) Filed: Jun. 25, 2013

(65) Prior Publication Data

US 2014/0219114 A1  Aug. 7, 2014

Related U.S. Application Data

(60) Provisional application No. 61/761,106, filed on Feb. 5, 2013.

(51) Int. Cl.
| | |
|---|---|
| *H04J 3/14* | (2006.01) |
| *H04L 12/26* | (2006.01) |
| *H04L 12/28* | (2006.01) |
| *H04J 1/16* | (2006.01) |

(52) U.S. Cl.
CPC ....................... *H04L 43/10* (2013.01)

(58) Field of Classification Search
CPC ............... H04L 43/12; H04L 1/1635
USPC .......................................... 370/252
See application file for complete search history.

(56) References Cited

U.S. PATENT DOCUMENTS

| | | | |
|---|---|---|---|
| 8,082,347 B2 | 12/2011 | Abdelhamid et al. | |
| 8,160,055 B1 | 4/2012 | Nadeau et al. | |
| 2004/0095930 A1* | 5/2004 | Bennett | H04L 12/2697 370/389 |

(Continued)

OTHER PUBLICATIONS

Hui, et al., "An IPv6 Routing Header for Source Routes with the Routing Protocol for Low-Power and Lossy Networks (RPL)", Request for Comments 6554, Mar. 2012, 13 pages, Internet Engineering Task Force Trust.

(Continued)

*Primary Examiner* — Andrew Chriss
*Assistant Examiner* — Voster Preval
(74) *Attorney, Agent, or Firm* — Parker Ibrahim & Berg LLC; James M. Behmke; Kenneth J. Heywood (57) ABSTRACT

In one embodiment, a targeted node in a computer network receives a probe generation request (PGR), and in response, generates a link-local multicast PGR (PGR-Local) carrying instructions for generating probes based on the PGR. The targeted node then transmits the PGR-Local to neighbors of the targeted node to cause one or more of the neighbors to generate and transmit probes to a collection device in the computer network according to the PGR-Local instructions. In another embodiment, a particular node in a computer network receives a link-local multicast probe generation request (PGR-Local) from a targeted node in the computer network, the targeted node having received the PGR-Local from a remote device, and determines how to generate probes based on instructions carried within the PGR-Local before sending one or more probes to a collection device in the computer network according to the PGR-Local instructions.

20 Claims, 10 Drawing Sheets

(56) References Cited

U.S. PATENT DOCUMENTS

| | | | |
|---|---|---|---|
| 2006/0215577 A1* | 9/2006 | Guichard | H04L 12/2697 370/254 |
| 2011/0286447 A1* | 11/2011 | Liu | H04L 45/74 370/389 |
| 2012/0307685 A1* | 12/2012 | Kim | H04W 48/16 370/255 |
| 2013/0031253 A1 | 1/2013 | Hui et al. | |
| 2013/0083658 A1 | 4/2013 | Vasseur et al. | |
| 2013/0159479 A1 | 6/2013 | Vasseur | |

OTHER PUBLICATIONS

Vasseur, et al., "Remote Probing for Remote Quality of Service Monitoring", U.S. Appl. No. 61/761,106, filed Feb. 5, 2013, U.S. Patent and Trademark Office.

Winter, et al., "RPL: IPv6 Routing Protocol for Low-Power and Lossy Networks", Request for Comments 6550, Mar. 2012, 157 pages, Internet Engineering Task Force Trust.

* cited by examiner

REMOTE PROBING FOR REMOTE QUALITY OF SERVICE MONITORING

RELATED APPLICATION

The present invention claims priority to U.S. Provisional Application Ser. No. 61/761,106, filed Feb. 5, 2013, entitled "REMOTE PROBING FOR REMOTE QUALITY OF SERVICE MONITORING", by Vasseur, et al., the contents of which are incorporated herein by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and states, and performance indicators), recognize complex patterns in these data, and solve complex problems such as regression (which are usually extremely hard to solve mathematically) thanks to modeling. In general, these patterns and computation of models are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data. Note that the example above is an over-simplification of more complicated regression problems that are usually highly multi-dimensional.

Learning Machines (LMs) are computational entities that rely on one or more ML algorithm for performing a task for which they haven't been explicitly programmed to perform. In particular, LMs are capable of adjusting their behavior to their environment (that is, "auto-adapting" without requiring a priori configuring static rules). In the context of LLNs, and more generally in the context of the IoT (or Internet of Everything, IoE), this ability will be very important, as the network will face changing conditions and requirements, and the network will become too large for efficiently management by a network operator. In addition, LLNs in general may significantly differ according to their intended use and deployed environment.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, techniques are shown and described relating to remote probing for remote quality of service monitoring. In one embodiment, a targeted node in a computer network receives a probe generation request (PGR), and in response, generates a link-local multicast PGR (PGR-Local) carrying instructions for generating probes based on the PGR. The targeted node then transmits the PGR-Local to neighbors of the targeted node to cause one or more of the neighbors to generate and transmit probes to a collection device in the computer network according to the PGR-Local instructions. In another embodiment, a particular node in a computer network receives a link-local multicast probe generation request (PGR-Local) from a targeted node in the computer network, the targeted node having received the PGR-Local from a remote device, and determines how to generate probes based on instructions carried within the PGR-Local before sending one or more probes to a collection device in the computer network according to the PGR-Local instructions.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1:
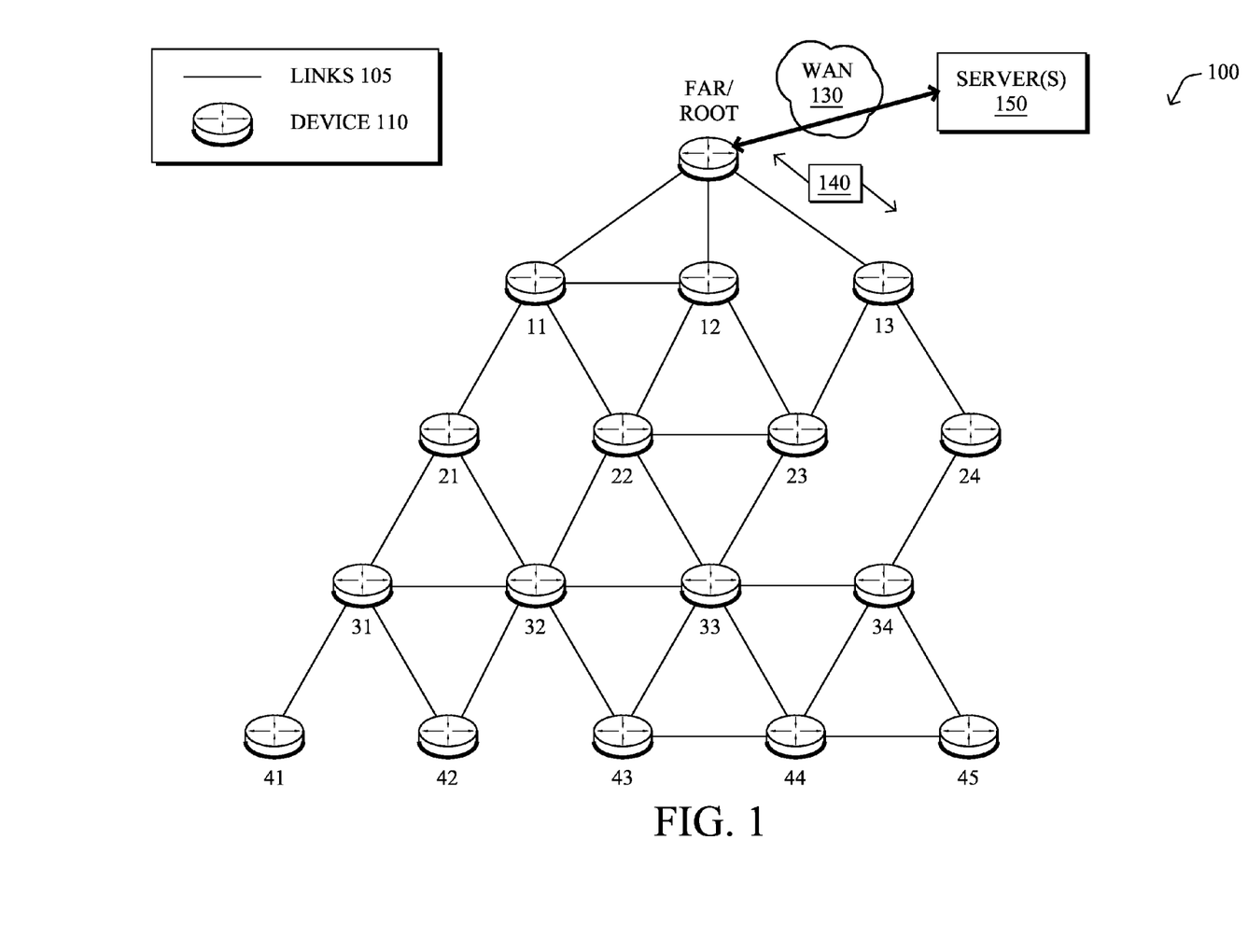
FIG. 1 illustrates an example communication network.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
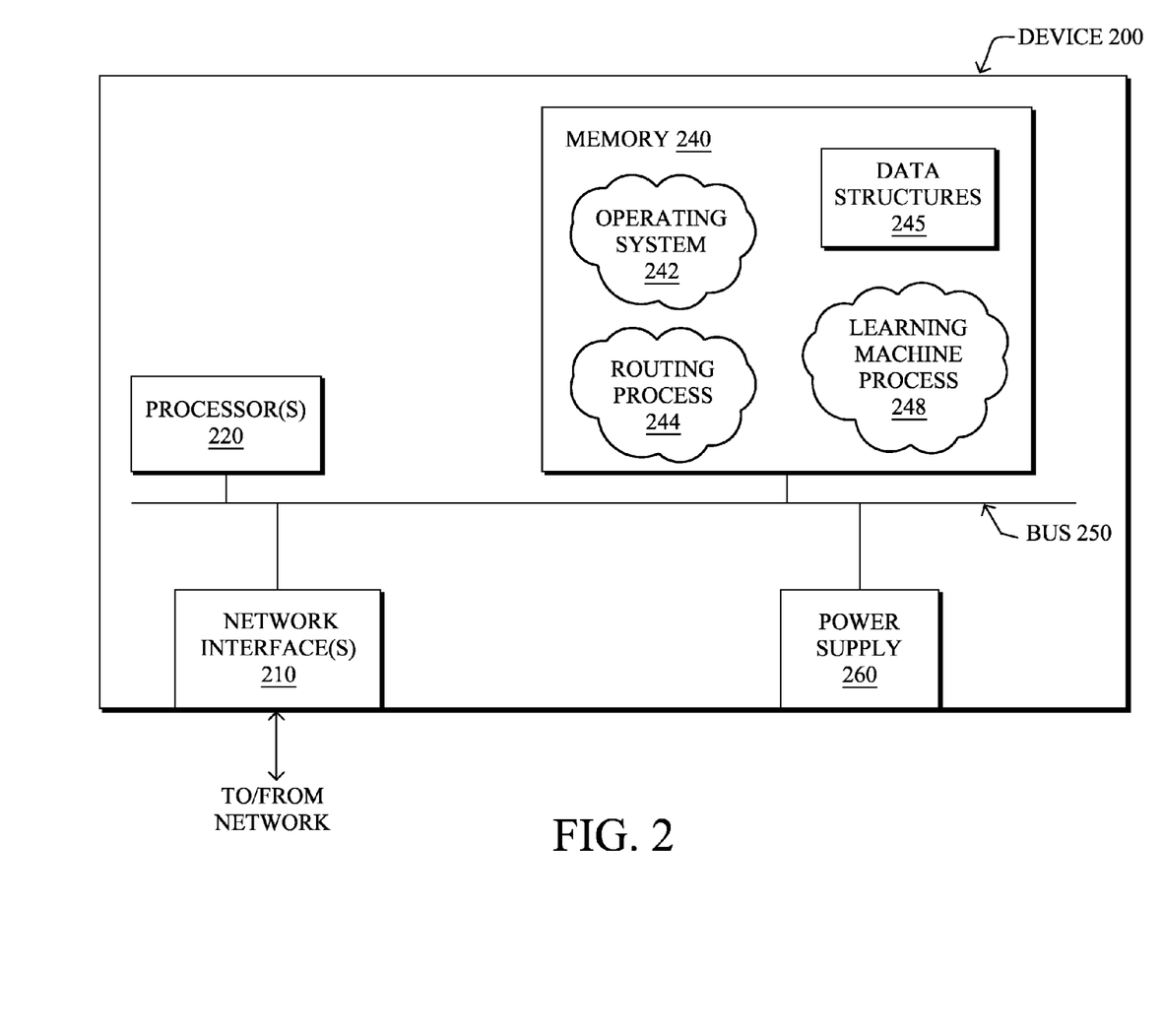
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
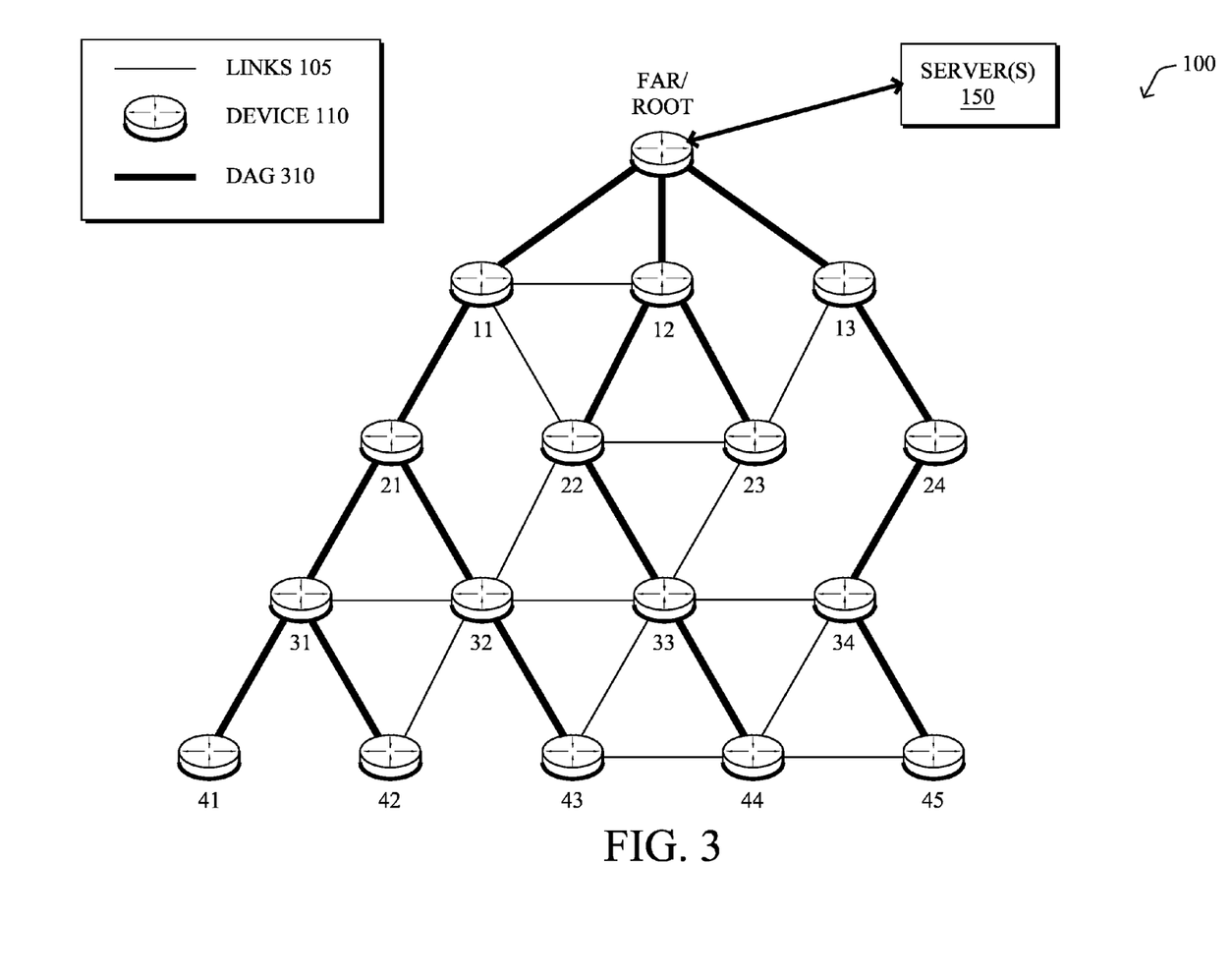
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

Learning Machine Technique(s)

As noted above, machine learning (ML) is concerned with the design and the development of algorithms that take as input empirical data (such as network statistics and state, and performance indicators), recognize complex patterns in these data, and solve complex problem such as regression thanks to modeling. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

(Notably, although the techniques herein are not strictly related to LMs, several LM-based technologies require gathering of additional information about the QoS along a dynamically learned path, as discussed later in this submission.)

To illustrate the critical need for QoS in LLNs, assume the example of Advanced Metering Infrastructure (AMI) networks. As indicated in its name, AMI includes a number of applications in addition to Automated Meter Reading (AMR). Utilities implementing AMI have documented the following list of applications that must operate over AMI networks:

1) Automated Meter Reading that involves periodically retrieving meter readings from each individual meter to a head-end server;
2) Firmware upgrades that involve communicating relatively large firmware images (500 KB or more) from a head-end server to one, multiple, or all devices;
3) Retrieving load curves;
4) Real-time alarms generated by meters (i.e. power outage events);
5) Periodically retrieving network management information from each meter to a Network Management System (NMS); and
6) Supporting demand response applications by sending multicast messages from a head-end device to large numbers of meters and more.

These different applications have significantly different traffic characteristics and service level agreements (SLAs) (e.g., unicast vs. multicast, small units of data vs. large units of data, low-latency vs. latency-tolerant, flows toward head-end vs. away from head-end). Furthermore, these applications must operate simultaneously over a highly constrained LLN network. An LLN can easily experience congestion especially when different applications are sending traffic simultaneously. Without proper mechanisms, these situations can cause networks to violate critical SLAs (e.g., delaying the reception of critical alarms from a meter). In addition, the use of FANs (Field Area Networks) are being extended to use cases such as Distributed Automation (DA) integrating DA gateways in these networks, thus making the FAN a true multi-service network where QoS is critical.

One main issue with existing techniques lies in the complexity of the overall QoS architecture on constrained devices. QoS techniques developed over the past two decades rely on several components: (1) Packet coloring and classification (by applications or Edge network entry points); (2) Congestion avoidance algorithms with random drops for back-pressure on TCP (e.g., wireless random early detection or "WRED"); (3) Queuing disciplines (preemptive queuing, round robin, dynamic priorities, etc.); (4) Bandwidth reservation (e.g., Diffserv (by CoS), Intserv (RSVP(-TE)); and (5) Input/Output shaping, to name a few. In the case of traffic shaping, sophisticated techniques relying on congestion-based traffic shaping have been proposed for LLNs so as to free up bandwidth for critical flows in shared bandwidth environments (RF and PLC).

A primary challenge, however, is the overall complexity of such QoS mechanisms in the IoT. Indeed, policies must be specified for packet coloring, congestion avoidance algorithms such as WRED must be configured on nodes, in addition to queuing disciplines. That is, the algorithms require a deep knowledge on traffic pattern, link layer characteristics, nodes' resources, etc., along with a number of parameters to configure on each individual device. The techniques currently available, therefore, are ill-suited to LLNs mostly because they require extra hardware components and heavy protocols, but more importantly because the traffic overhead is an order of magnitude too heavy for LLNs. As such, the techniques herein specify a way to monitor the QoS provided by the network through the use of probes in a manner suitable to LLNs.

In particular, the techniques herein provide QoS monitoring in constrained networks, illustratively by 1) sending a unicast message to an intelligently determined node indicating a set of parameters related to the remote generation of QoS probes from a set of nodes without sending a set of costly unicast probes generation requests to these nodes (in contrast with existing approaches); 2) generating local acknowledgements by the set of nodes to the requesting remote node to confirm that the request has been processed and in case of negative replies (or lack of positive acknowledgement) the remote requesting node re-generates the request using an increased time-to-live (TTL) and/or unicast messages; and 3) generating local probes according to the request on the remote nodes, coupled with an algorithm allowing for accumulation of recorded delays to efficiently compress recorded link delays.

Illustratively, the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

Figure 4:
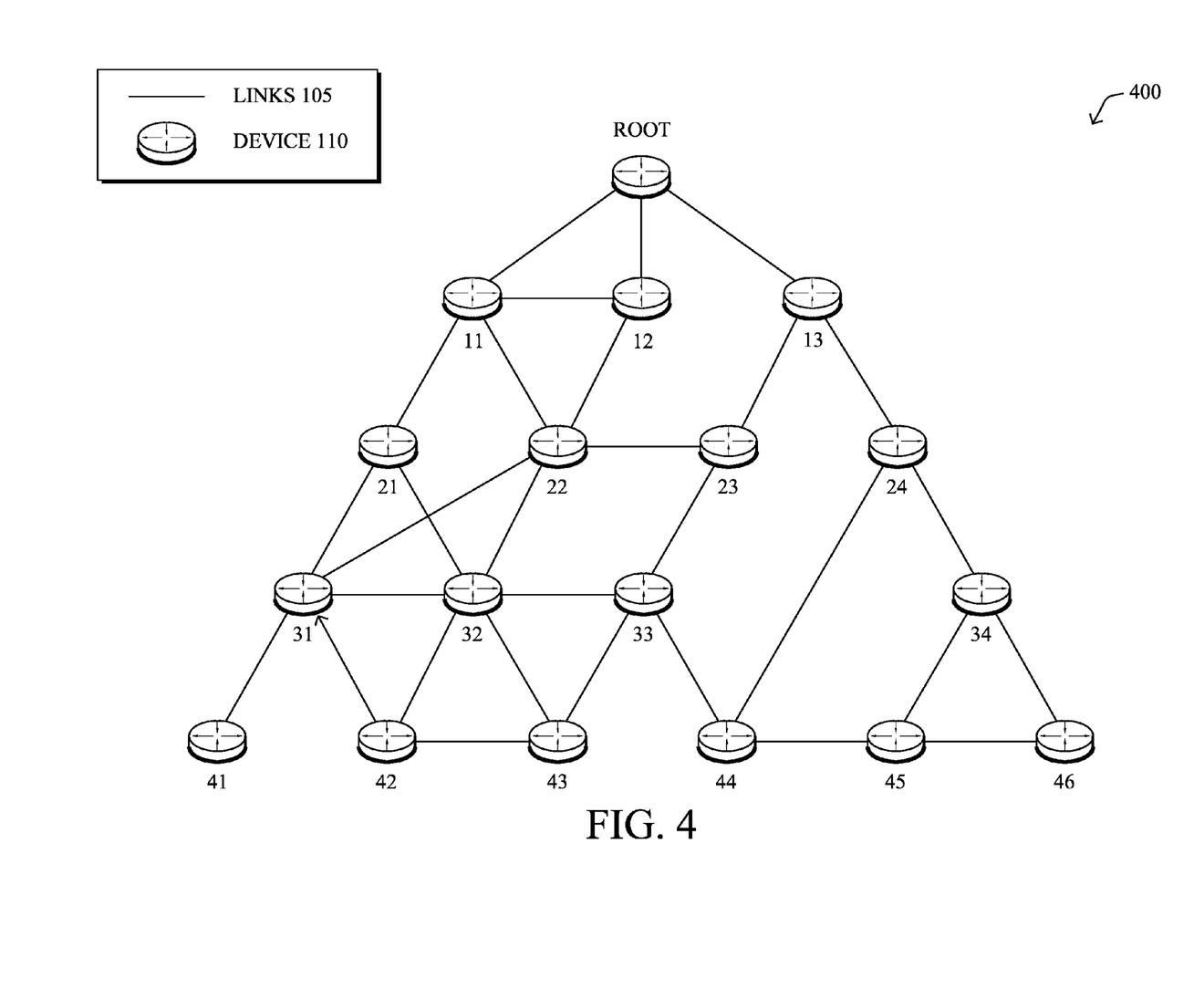
FIG. 4 illustrates another example communication network.

Operationally, a mechanism of initiating remote point-to-multipoint QoS probe requests is first herein defined. In contrast with existing techniques consisting of sending a unicast message to request an end node to generate a probe for QoS monitoring, the techniques herein use a remote probe generation technique targeted at the specific node. That specific node could then generate local requests, or alternatively use a tunneling approach with the tunnel end point being the targeted remote node. Learning Machines can be used to determine the set of nodes S experiencing unacceptable delays and find a node in the network close to the set of nodes from which probes must be generated. For example, with reference to the modified network architecture in FIG. 4, if a learning machine or an NMS (shown in FIG. 1) determines that nodes 34, 44, 45 and 46 are experiencing abnormal delays, a remote node that lies in the "area of influence" of these set of nodes is selected (e.g., node 45). This node may or may not be part of the set S. Note that with existing techniques, the QoS monitoring agent would send a set of unicast messages to each node in the set S requesting them to generate a QoS monitoring probe.

Figure 5:
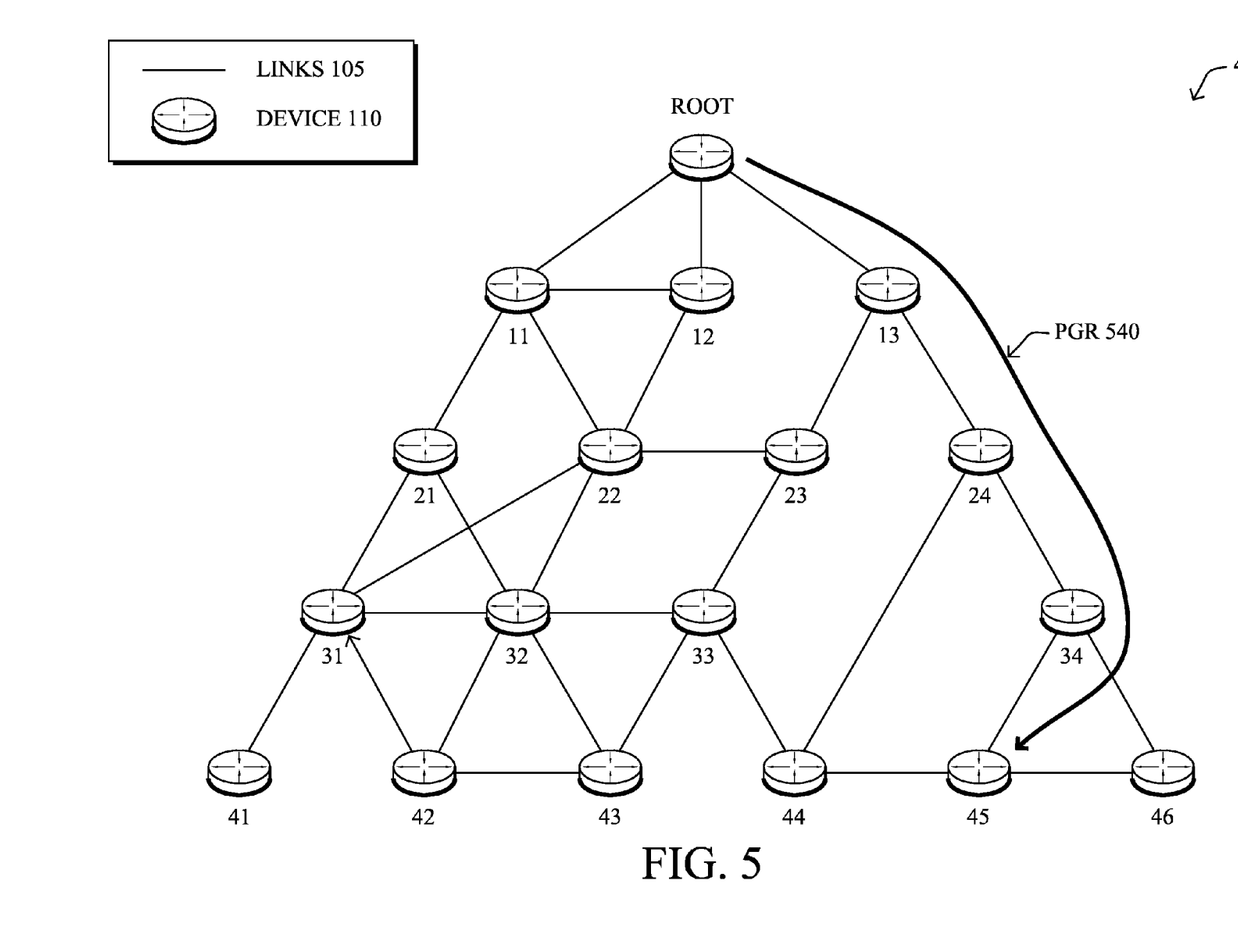
FIG. 5 illustrates an example probe generation request message.

In contrast to existing techniques, the first component of the techniques herein consists of sending a newly defined message called the Probe Generation Request (PGR) message to a targeted node T, as shown in FIG. 5 (PGR 540). In one embodiment, the PGR message is a unicast IPv6 message carrying the following set of TLVs (some of these information may be optional):

1) Active time range [B, E], where B is the begin/start time and E is the end time;
2) Number of trains of probes T;
3) Number of probes per train N;
4) Class of traffic of interest (e.g., list of Diffserv Code points);
5) Ratio of traffic to apply sampling technique R;
6) Flag to indicate per-link or end-to-end delay (L); and
7) Optionally a list of neighbors to probe.

The time range [B, E] indicates the time window that devices use to perform the traffic generation. Setting B and E to zero indicates that the devices should begin sending traffic substantially immediately, according to the traffic profile.

The traffic profile consists of T packet trains, with each train consisting of N packets. The request may be to generate a unique probe for a node in the set S (T=1, N=1), one train of probes consisting in N probes (T=1, N<>1) or an arbitrary set of trains made of N probes each. The probe may be generated after packet marking (if the DSCP field is present) to monitor a specific class of traffic.

In some cases, it is only necessary to collect time delay samples on a subset of the traffic. The R value indicates to the node what fraction of traffic it should apply the time-stamping technique.

The L bit is used to indicate whether the probe is used to measure per-hop link delays or end-to-end delays. When measuring per-hop delays, a timestamp is recorded by each hop along the path within the packet. When measuring end-to-end delays, only the source records a timestamp within the packet.

According to one or more embodiments herein, upon receiving the unicast PGR message from the QoS monitoring agent, the node T generates and sends a link-local multicast PGR_L (Local) message with TTL=1 and arms a timer T1 (which may be pre-configured, learned during registration, via NMS, etc.) waiting for local ACK message from each node listed in the PGR_L message. Note that the PGR_L, an example of which shown in FIG. 6 (PGR_L 640) may be identical to the original PGR message but generally comprises an additional TLV listing all nodes in the set S (since the original PGR message may comprise the list S of remote nodes that should send probes). In one embodiment the list of IPv6 addresses in the set S may be compressed (e.g., using RFC6554) or the node T may alternatively use of Bloom Filter (note that false positives are not problematic in this case, since it would only lead to a small increase in probes). In another embodiment, the node that receives the PGR message can itself respond to the QoS agent with probes because it could lie in the area of influence of the nodes that are actually suffering from degraded QoS. This would reduce transmission of multicast packets but at the same time give a fairly accurate view of the health of the area. To add to this, the node that receives the PGR message can take a real time decision between the two options above based on what it is observing in terms of traffic and performance.

Figure 6:
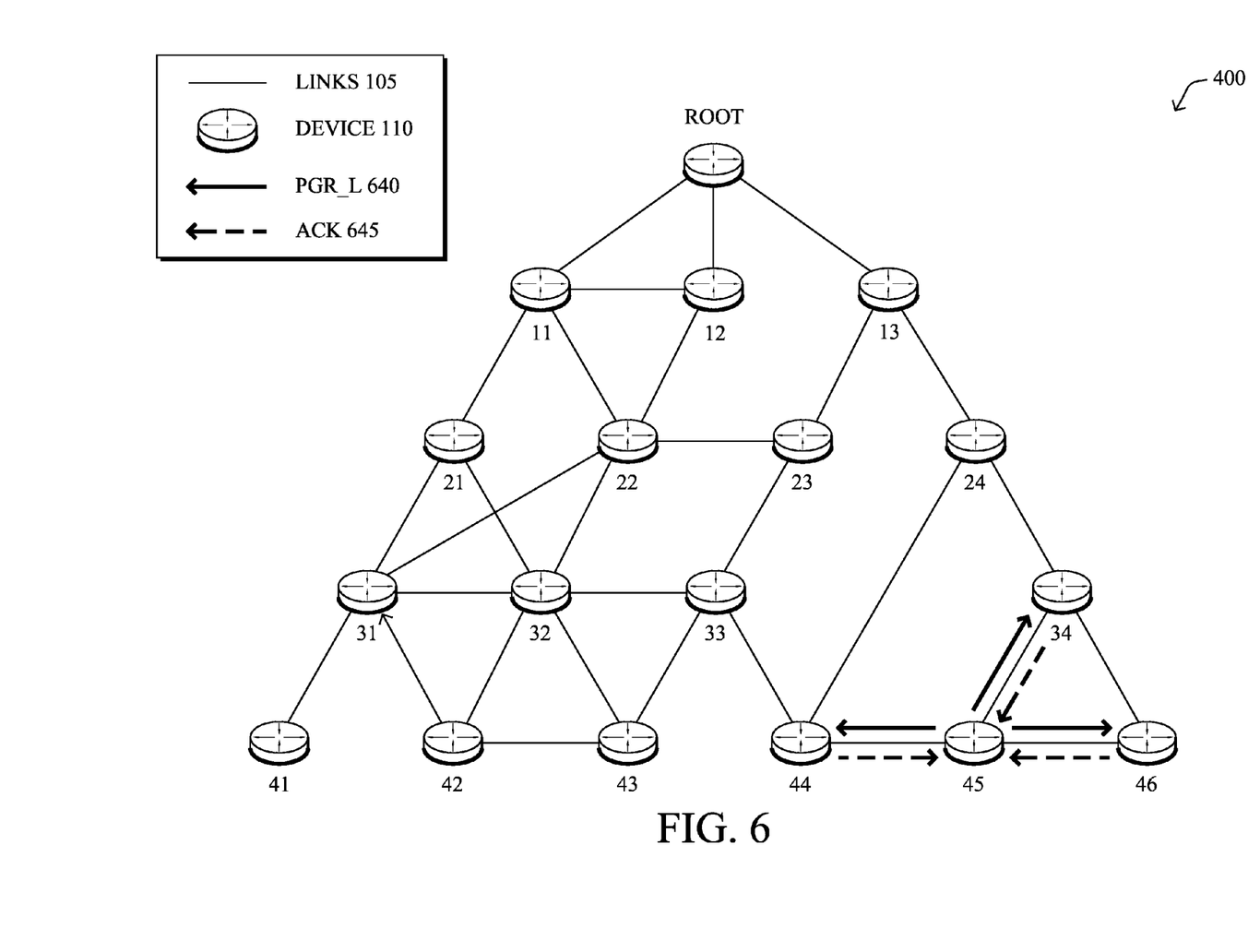
FIG. 6 illustrates an example of a local probe generation request.
Figure 7:
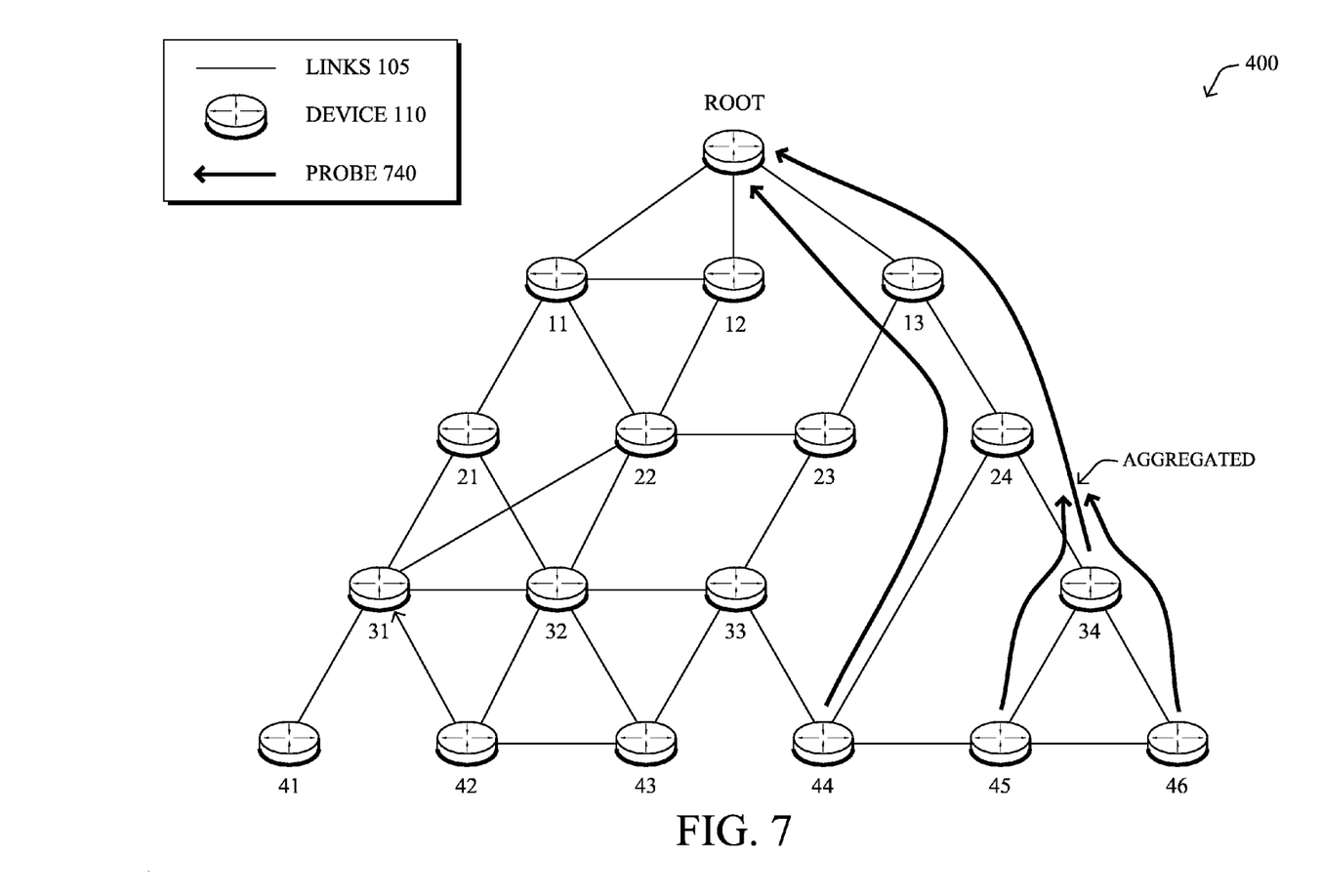
FIG. 7 illustrates an example of probing.

Further according to one or more embodiments herein, each node receiving the PGR_L message may perform the following set of actions:

It sends a unicast L3 ACK message to the node T (ACK 645 in FIG. 6);

It then inspects the TLVs present in the PGR_L message in order to determine how QoS probes should be generated (timestamps, number of trains, number of packet per train, packet marking, etc.), where probes 740 are shown in FIG. 7. If the request is urgent (D=0), the node substantially immediately sends a QoS probe to the QoS monitoring agent (address learned from server discovery during registration, using the routing protocol or other service discovery protocol). If the request is not urgent, the node starts a timer with a random delay in the range of D and waits to timestamp the next user packet of the class of service of interest that it needs to forward. This is an embodiment in which efficient piggybacking of timestamps is done on user traffic. If no user traffic of the class of service of interest needs to be forwarded before the expiration of the timer, the node generates a dedicated QoS probe to the QoS monitoring agent.

In one embodiment, the random delay range for generating probes is based on D but scaled to be inversely proportional to the rank of a node. This technique minimizes the number of messages that need to be communicated within the network. For example, suppose that both nodes 34 and 46 are in the set S. Node 46 would first generate a probe; upon detecting the QoS probe the node 34 would then wait until it generates its own probe and thus it could record the delay on link 34-46; the aggregated probe would then travel up to the FAR recording link delays. The example shows that this would allow to record link delays along one path (34-24-13-root) instead of two paths (46-34-24-13-root, and 34-24-13-root). In other words, this technique allows for aggregation of delay reporting along common paths used by the probe generated by nodes in the set S.

Figure 8:
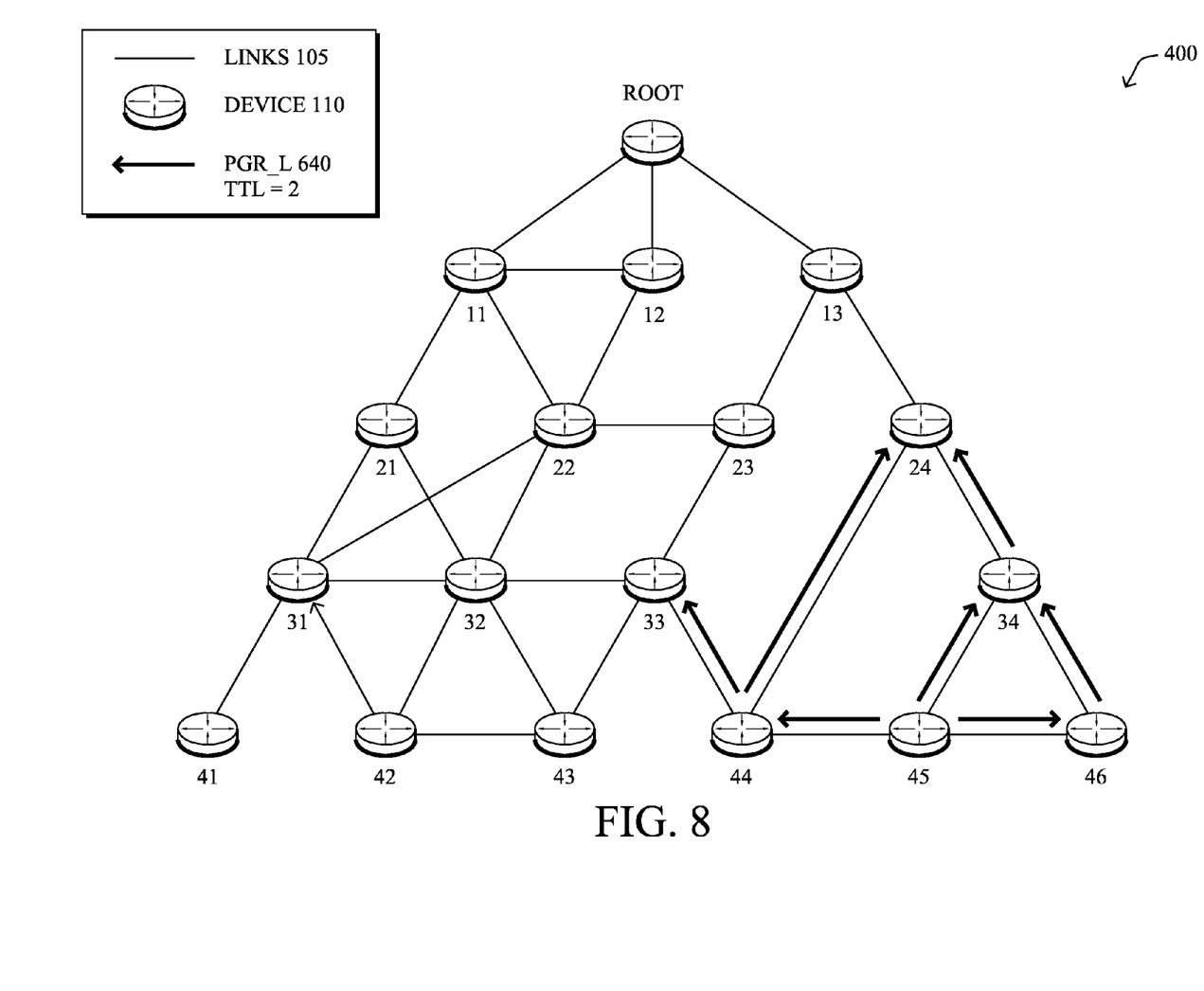
FIG. 8 illustrates another example of a local probe generation request.

If after the expiration of the timer T1, the node T that generated the PGR_L has not received |S| ACKs, it inspects the number of nodes in the set S that sent an acknowledgment. If the ratio of nodes that acknowledged the request falls below pre-defined threshold, a new PGR_L message is generated after incrementing the TTL, as shown in FIG. 8. Another option consists in sending unicast PGR_L messages to each node in S for which not acknowledgment has been received. If after repeated attempts, some ACKs do not arrive, this process may not be retried but information of this behavior is sent upstream to the NMS and/or LM engine as it is representative of the QoS being experienced by those nodes.

In another embodiment, the PGR_L message is built by the QoS monitoring agent and encapsulated in an IP tunnel ending on the T Node. The PGR_L message is a link local multicast message with the format described above that is sent within a unicast IPv6 message (with source address being that of the QoS monitoring agent and the destination address being that of node T). Upon receiving the IPv6 message the node T removes the outer header of the source routed message and forward the link-local PGR_L message. The same algorithm for local ACK and TTL increment is used by the target node T. This technique is less resource consuming for the target node T that does not have to process the PGR message, which may be beneficial on constrained nodes.

Figure 9:
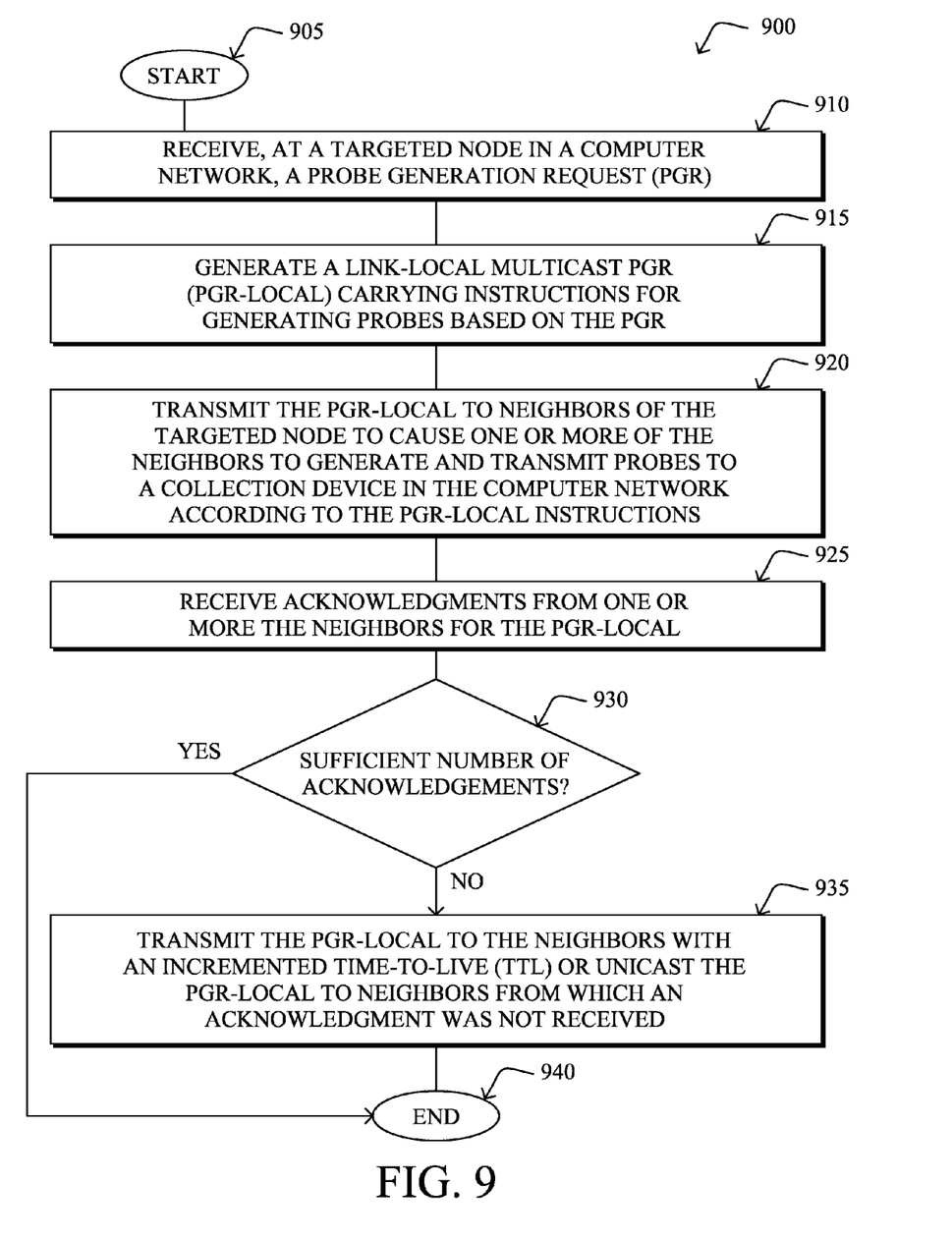
FIG. 9 illustrates an example simplified procedure for remote probing for remote QoS monitoring in accordance with one or more embodiments described herein, from the perspective of the targeted node.

FIG. 9 illustrates an example simplified procedure 900 for remote probing for remote QoS monitoring in accordance with one or more embodiments described herein, from the perspective of the targeted node (e.g., node 45). The procedure 900 may start at step 905, and continues to step 910, where, as described in greater detail above, a targeted node receives a probe generation request (PGR) 540, which may either be unicast or else received as a tunneled PGR-Local. As noted above, the PGR may indicate one or more probing instructions, such as an active time range for probing, a number of probe trains, a number of probes per probe train, a class of traffic to use for probes, a ratio of traffic to apply sampling, and/or an indication of per-link or end-to-end delay measurement. In step 915, the targeted node generates a link-local multicast PGR (PGR-Local) 640 carrying instructions for generating probes based on the PGR. (Note that as described above, generating the PGR-Local may comprise decapsulating the tunneled PGR-Local.) In step 920, the targeted node transmits the PGR-Local to its neighbors (e.g., nodes 34, 44, and 46) to cause one or more of the neighbors to generate and transmit probes to a collection device in the computer network according to the PGR-Local instructions (e.g., as in procedure 1000 of FIG. 10 below). As mentioned above, the PGR-Local may identify a subset of the neighbors to generate and transmit probes.

In step 925, the targeted node should receive acknowledgments 645 from one or more the neighbors for the PGR-Local, and if there are an insufficient number of acknowledgments received in step 930, then in step 935 the targeted node may either transmit the PGR-Local to the neighbors with an incremented time-to-live (TTL) or unicast the PGR-Local to neighbors from which an acknowledgment was not received. The illustrative procedure 900 may then end in step 940 (notably, with the option to continue increasing the TTL or else to send a report to the collection device regarding the non-acknowledging neighbors).

Figure 10:
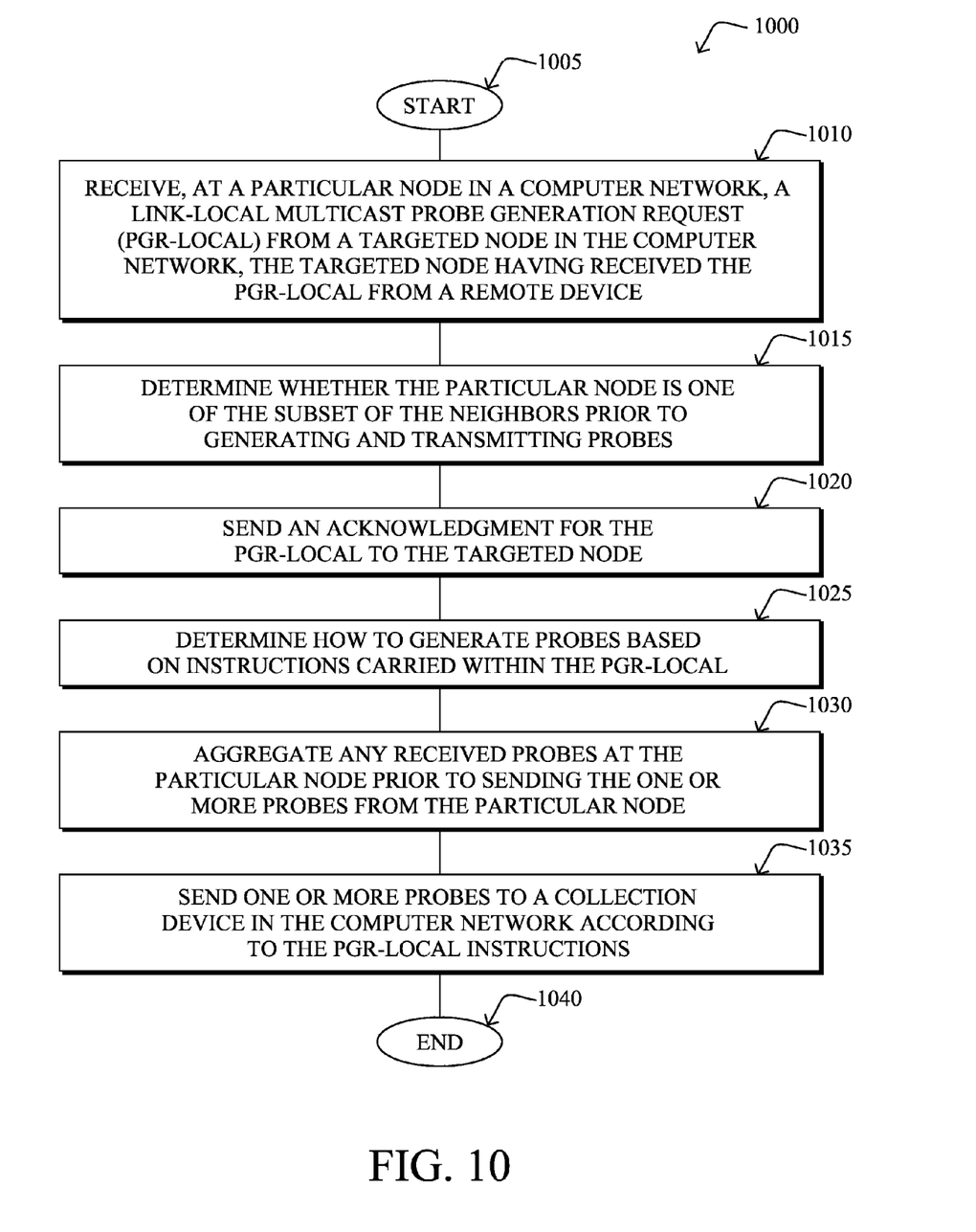
FIG. 10 illustrates another example simplified procedure for remote probing for remote QoS monitoring in accordance with one or more embodiments described herein, from the perspective of a probing node.

In addition, FIG. 10 illustrates another example simplified procedure 1000 for remote probing for remote QoS monitoring in accordance with one or more embodiments described herein, from the perspective of a probing node (e.g., nodes 34, 44, and 46). The procedure 1000 may start at step 1005, and continues to step 1010, where, as described in greater detail above, a particular node in a computer network receives a link-local multicast probe generation request (PGR-Local) from a targeted node in the computer network, the targeted node having received the PGR-Local from a remote device (as detailed above). Note that where the PGR-Local identifies a subset of the neighbors to generate and transmit probes, the procedure 1000 may further determine whether the particular node is one of the subset of the neighbors prior to continuing in step 1015. Assuming the particular node is identified (or all receiving nodes are to participate), then in step 1020 the particular node may send an acknowledgment for the PGR-Local to the targeted node, and determines how to generate probes based on instructions carried within the PGR-Local in step 1025. If the instructions are to send probes at a time inversely proportional to a distance of the particular node from the collection device, then in step 1030 the particular node may aggregate any received probes prior to sending the one or more probes to a collection device in the computer network according to the PGR-Local instructions in step 1035. Notably, as mentioned above, the probes may be explicit probes or piggybacked information on data traffic. The procedure 1000 illustratively ends at step 1040.

It should be noted that while certain steps within procedures 900-1000 may be optional as described above, the steps shown in FIGS. 9-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 900-1000 are described separately, certain steps from each procedure may be incorporated into each other procedure, and the procedures are not meant to be mutually exclusive.

The techniques described herein, therefore, provide for remote probing for remote quality of service monitoring. In particular, the techniques herein allow for significantly reducing the additional traffic generated for QoS monitoring in constrained networks. In contrast with existing techniques, where nodes are requested to send a probe after receiving unicast message, the techniques herein send one message to a targeted node in charge of locally handling all requests with an ACK, which leads to significantly optimized QoS probe monitoring management.

While there have been shown and described illustrative embodiments that provide for remote probing for remote quality of service monitoring, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

receiving, at a targeted node in a computer network, a probe generation request (PGRL wherein the targeted node provides remote probing for remote quality of service monitoring of one or more adjacent neighbors;

in response, generating a link-local multicast PGR (PGR-Local) carrying instructions for generating probes based on the PGR;

transmitting the PGR-Local to the one or more neighbors of the targeted node to cause the one or more of the neighbors to generate and transmit probes to a collection device in the computer network according to the PGR-Local instructions;

receiving acknowledgments from the one or more neighbors for the PGR-Local; and in response to an insufficient number of acknowledgments, transmitting the PGR-Local to the neighbors with an incremented time-to-live (TTL).

2. The method as in claim 1, wherein the PGR is received at the targeted node as a tunneled PGR-Local, and wherein generating the PGR-Local comprises decapsulating the tunneled PGR-Local.

3. The method as in claim 1, wherein the PGR comprises one or more probing instructions selected from a group consisting of:
   an active time range for probing;
   a number of probe trains;
   a number of probes per probe train;
   a class of traffic to use for probes;
   a ratio of traffic to apply sampling; and
   an indication of per-link or end-to-end delay measurement.

4. The method as in claim 1, further comprising:
   identifying a subset of the neighbors to generate and transmit probes in the PGR-Local.

5. The method as in claim 1, further comprising:
   receiving acknowledgments from one or more the neighbors for the PGR-Local; and
   in response to an insufficient number of acknowledgments, unicasting the PGR-Local to neighbors from which an acknowledgment was not received.

6. A method, comprising:
   receiving, at a particular node in a computer network, a link-local multicast probe generation request (PGR-Local) from a targeted node in the computer network, the targeted node having received the PGR-Local from a remote device, wherein the targeted node provides remote probing for remote quality of service monitoring of the particular node which is an adjacent neighbor of the targeted node;
   determining how to generate probes based on instructions carried within the PGR-Local,
   sending one or more probes to a collection device in the computer network according to the PGR-Local instructions,
   after receiving the PGR-Local sending the one or more probes within a random delay in a time range of D a delay range after receiving the PGR Local that is inversely proportional to a distance of the particular node from the collection device;
   and
   aggregating any received probes at the particular node prior to sending the one or more probes from the particular node.

7. The method as in claim 6, wherein the PGR-Local comprises one or more probing instructions selected from a group consisting of:
   an active time range for probing;
   a number of probe trains;
   a number of probes per probe train;
   a class of traffic to use for probes;
   a ratio of traffic to apply sampling; and
   an indication of per-link or end-to-end delay measurement.

8. The method as in claim 6, wherein the PGR-Local identifies a subset of the neighbors to generate and transmit probes, the method further comprising:
   determining whether the particular node is one of the subset of the neighbors prior to generating and transmitting probes.

9. The method as in claim 6, wherein the probes are one or both of explicit probes or piggybacked information on data traffic.

10. The method as in claim 6, further comprising:
    sending an acknowledgment for the PGR-Local to the targeted node.

11. An apparatus, comprising:
    one or more network interfaces to communicate with a computer network;
    a processor coupled to the network interfaces and adapted to execute one or more processes; and
    a memory configured to store a process executable by the processor, the process when executed operable to:
    receive, as a targeted node in a computer network, a probe generation request (PGR), wherein the targeted node provides remote probing for remote quality of service monitoring of one or more adjacent neighbors;
    in response, generate a link-local multicast PGR (PGR-Local) carrying instructions for generating probes based on the PGR; and
    transmit the PGR-Local to neighbors of the targeted node to cause the one or more of the neighbors to generate and transmit probes to a collection device in the computer network according to the PGR-Local instructions,
    wherein the process when executed is further operable to:
    receive acknowledgments from one or more the neighbors for the PGR-Local; and
    in response to an insufficient number of acknowledgments, transmit the PGR-Local to the neighbors with an incremented time-to-live (TTL).

12. The apparatus as in claim 11, wherein the PGR is received at the targeted node as a tunneled PGR-Local, and wherein generating the PGR-Local comprises decapsulating the tunneled PGR-Local.

13. The apparatus as in claim 11, wherein the PGR comprises one or more probing instructions selected from a group consisting of:
    an active time range for probing;
    a number of probe trains;
    a number of probes per probe train;
    a class of traffic to use for probes;
    a ratio of traffic to apply sampling; and
    an indication of per-link or end-to-end delay measurement.

14. The apparatus as in claim 11, wherein the process when executed is further operable to:
    identify a subset of the neighbors to generate and transmit probes in the PGR-Local.

15. The apparatus as in claim 11, wherein the process when executed is further operable to:
    receive acknowledgments from one or more the neighbors for the PGR-Local; and
    in response to an insufficient number of acknowledgments, unicast the PGR-Local to neighbors from which an acknowledgment was not received.

16. An apparatus, comprising:
    one or more network interfaces to communicate with a computer network;
    a processor coupled to the network interfaces and adapted to execute one or more processes; and
    a memory configured to store a process executable by the processor, the process when executed operable to:
    receive, as a particular node in a computer network, a link-local multicast probe generation request (PGR-Local) from a targeted node in the computer network, the targeted node having received the PGR-Local from a remote device, wherein the targeted node provides remote probing for remote quality of service monitoring of the particular node which is an adjacent neighbor of the targeted node;

determine how to generate probes based on instructions carried within the PGR-Local; and send one or more probes to a collection device in the computer network according to the PGR-Local instructions, wherein the process when executed is further operable to:

after receiving the PGR-Local send the one or more probes within a random delay in a time range of D a delay range after receiving the PGR Local that is inversely proportional to a distance of the particular node from the collection device; and aggregate any received probes at the particular node prior to sending the one or more probes from the particular node.

17. The apparatus as in claim 16, wherein the PGR-Local comprises one or more probing instructions selected from a group consisting of:

an active time range for probing;

a number of probe trains;

a number of probes per probe train;

a class of traffic to use for probes;

a ratio of traffic to apply sampling; and an indication of per-link or end-to-end delay measurement.

18. The apparatus as in claim 16, wherein the PGR-Local identifies a subset of the neighbors to generate and transmit probes, and wherein the process when executed is further operable to:

determine whether the particular node is one of the subset of the neighbors prior to generating and transmitting probes.

19. The apparatus as in claim 16, wherein the probes are one or both of explicit probes or piggybacked information on data traffic.

20. The apparatus as in claim 16, wherein the process when executed is further operable to:

send an acknowledgment for the PGR-Local to the targeted node.

\* \* \* \* \*